Figure 1:
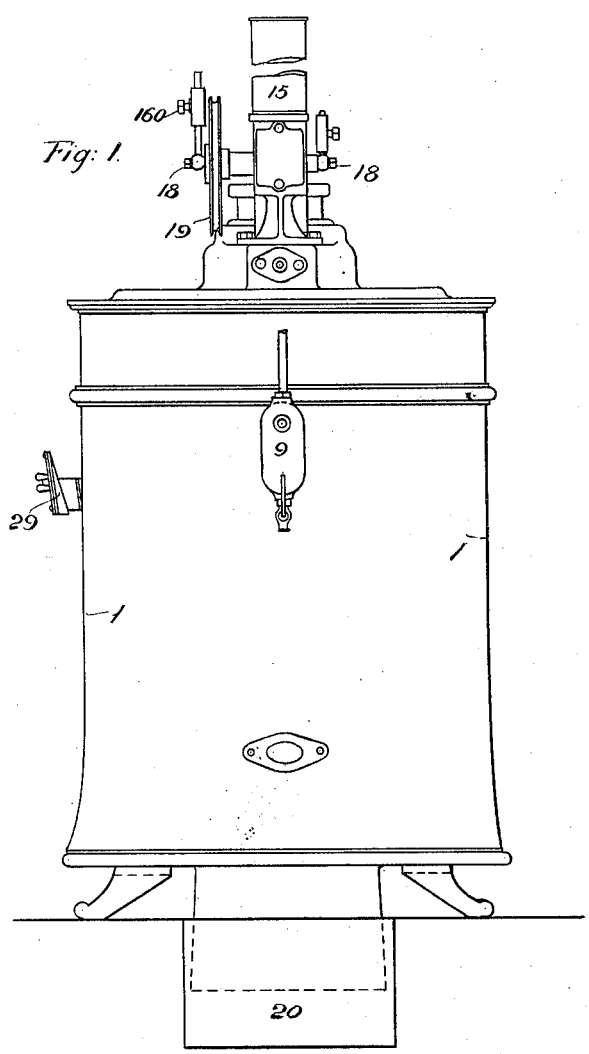

No. 736,636. PATENTED AUG. 18, 1903.
C. H. SCHILL & H. G. HILLS.
WATER GAS GENERATOR.
APPLICATION FILED JAN. 20, 1903.
NO MODEL. 5 SHEETS—SHEET 1.

WITNESSES
INVENTORS
Charles Henry Schill
Horace Gastineau Hills
BY
ATTORNEYS

No. 736,636. PATENTED AUG. 18, 1903.
C. H. SCHILL & H. G. HILLS.
WATER GAS GENERATOR.
APPLICATION FILED JAN. 20, 1903.
NO MODEL. 5 SHEETS—SHEET 2.
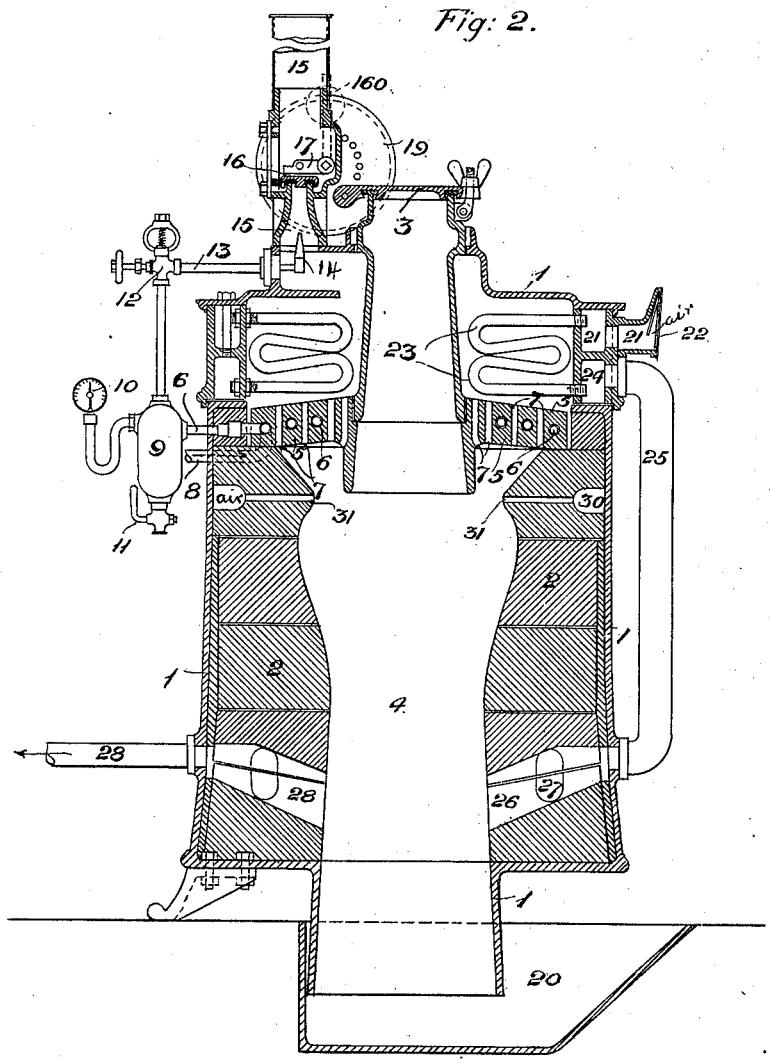
WITNESSES
INVENTORS
Charles Henry Schill
Horace Gastineau Hills
BY
ATTORNEYS

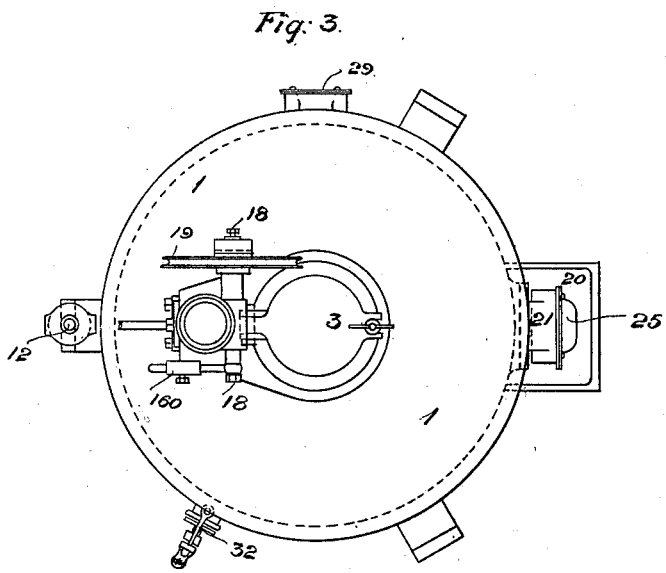

No. 736,636. PATENTED AUG. 18, 1903.
C. H. SCHILL & H. G. HILLS.
WATER GAS GENERATOR.
APPLICATION FILED JAN. 20, 1903.
NO MODEL. 5 SHEETS—SHEET 4.
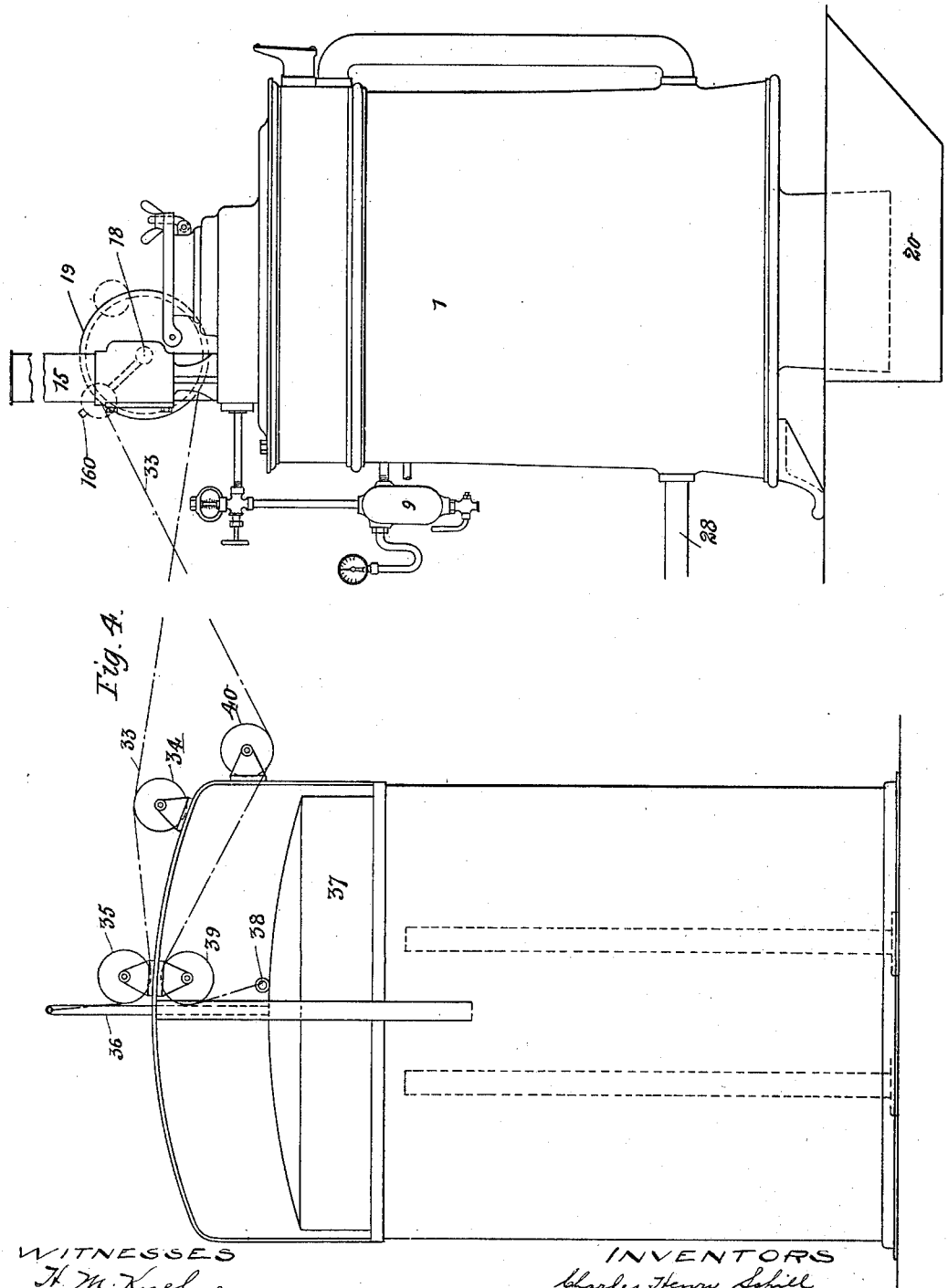

No. 736,636. PATENTED AUG. 18, 1903.
C. H. SCHILL & H. G. HILLS.
WATER GAS GENERATOR.
APPLICATION FILED JAN. 20, 1903.
NO MODEL. 5 SHEETS—SHEET 5.
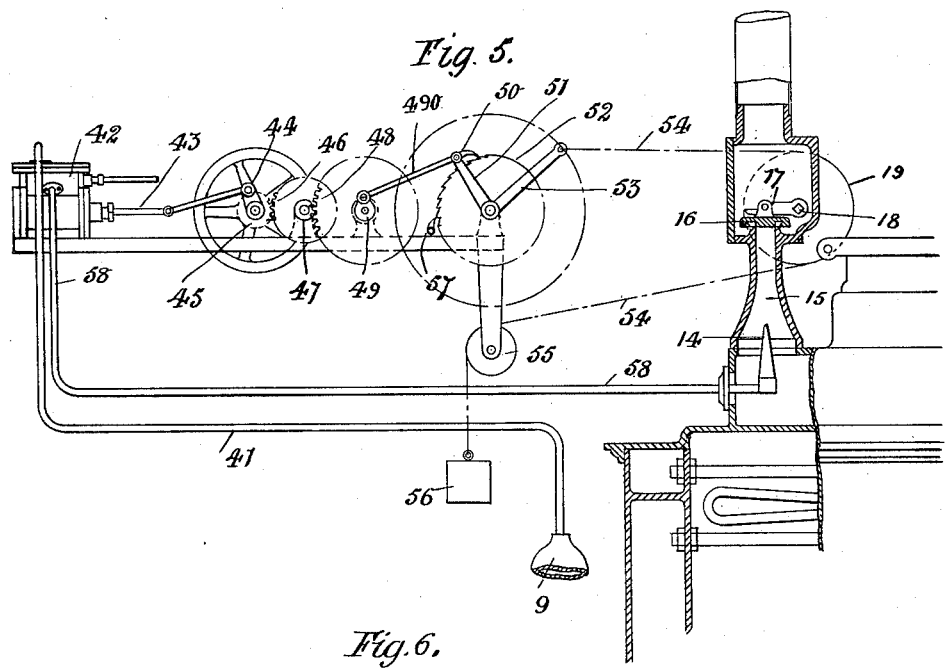
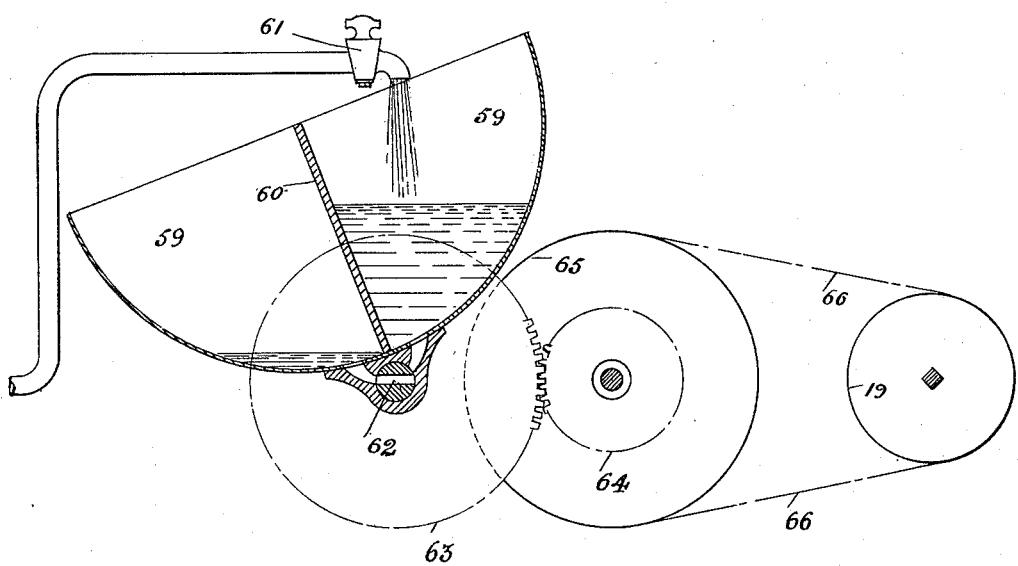

No. 736,636. Patented August 18, 1903.

UNITED STATES PATENT OFFICE.

CHARLES HENRY SCHILL, OF MANCHESTER, AND HORACE GASTINEAU HILLS, OF HYDE, ENGLAND.

WATER-GAS GENERATOR.

SPECIFICATION forming part of Letters Patent No. 736,636, dated August 18, 1903.

Application filed January 20, 1903. Serial No. 139,834. (No model.)

*To all whom it may concern:*

Be it known that we, CHARLES HENRY SCHILL, merchant, of 117 Portland street, Manchester, in the county of Lancaster, and HORACE GASTINEAU HILLS, engineer, of Newton Iron Works, Hyde, in the county of Chester, England, have invented certain new and useful Improvements in the Construction of Producer-Gas Generators, of which the following is a specification.

Our invention consists of improvements in the construction of producer-gas generators whereby simplification of operation is obtained, together with economy in the cost of construction, and the resulting gas being of a superior quality may be employed for a variety of useful purposes, such as illuminating, heating, and motive power.

The system is particularly applicable to small installations, where constant supervision and skilled attendance are not readily obtainable.

In order that our invention may be fully understood and readily carried into effect, we will describe the same with reference to the accompanying three sheets of drawings, in which—

Figure 1 is an elevation, Fig. 2 is a sectional elevation, and Fig. 3 a plan, of our improved gas-generating apparatus. Fig. 4 is an elevation of the apparatus, showing the generator and gas-holder and an arrangement for regulating the position of the chimney-valve from and in accordance with the movements of the gas-holder. Fig. 5 is an elevation, partly sectional, of an arrangement in which a small steam-motor is employed to effect the reversal of the chimney-valve. Fig. 6 is a sectional elevation of an arrangement of a water-balance for reversing the chimney-valve.

The generator consists, substantially, of the usual metal vertical case 1, lined with refractory material 2 and having at the top a feeding-hopper 3, which may be opened or closed, and below a vertical cavity 4 for the reception of coal, coke, wood, or such other combustible material as may be advantageously employed.

The top of the generator is equipped with a steam-raising and heat-storing device consisting, preferably, of a mass of cast-iron 5, within which a tubular coil of wrought-iron pipe 6 is embedded, and the mass of iron is perforated at 7 to allow of the passage of the products of combustion. The coiled pipe 6 is connected by means of a branch 8 and stopcock (not shown) with a water-supply under suitable pressure, such as that from a high-level tank. The delivery end of the coiled pipe 6 is connected to a steam-drum 9, fitted with a pressure-indicating gage 10, a blow-off cock 11, and a regulating-valve 12, which controls the delivery of steam through a pipe 13 to a jet or nozzle 14, placed at the base of a chimney 15 and directed upward in such a way that the issuing steam from the nozzle 14 causes a draft up the chimney when the latter is unobstructed. Immediately above the steam-nozzle 14 and within the chimney 15 is fitted a movable valve 16 or equivalent device capable of being opened or closed from outside the chimney. A gas-holder is provided to receive the gas as produced, and the top of the gas-holder is connected by mechanism with the valve or equivalent 16 in such a way that when the holder is raised to its utmost limit the said valve is opened, and when it has sunk to its predetermined limit the valve is closed, both movements being automatic. In this arrangement the chain 33 passes around the wheel 19, which is fixed on the spindle 18 of the chimney-valve 16. This chain passes over a guide-pulley 34, under the guide-pulley 35, to the top of the bar 36, fixed on the movable cylinder 37 of the gas-holder, which is supplied with gas from the generator through the pipe 28. The other end of the chain is secured at 38 to the top of the holder and passes over a guide-pulley 39 and under a guide-pulley 40 to the top of the pulley 19, around which it is passed before returning to the top of the bar 36, as already described. The weighted lever 160 is fixed on the axle or spindle 18 of the pulley 19 and assists in opening the valve and also in maintaining it closed.

The following describes the operation of automatically opening and closing the valve 16 by the movements of the holder: Assuming the gas-holder to be rising when in the position shown in the drawings, the chain 33 is being moved, and consequently the weighted lever 160 is in the course of being moved from its extreme left-hand position, Fig. 4, toward the vertical position, which it reaches at approximately the same moment that the gasometer reaches its extreme upward limit, and the moment that the weighted lever passes over the center its weighted end causes it to fall quickly over to its extreme right-hand position, the chimney-valve 16 being by this means thrown wide open. The blowing period, during which air is drawn into the generator and the fuel is brought to the required degree of incandescence, will then take place, and as soon as the consumption of gas reduces the supply in the holder the latter will begin to fall and reverse the above-described movement of the chain 33, wheel 19, and gradually draw back the weighted arm 160 from its extreme right-hand position until it passes over the vertical and falls into its extreme left-hand position, thereby automatically closing the chimney-valve 16 and causing the operation of gas-making to be resumed.

The lower part of the generator is provided with an outlet for clinker or ashes, this being preferably sealed by means of a water-lute 20.

The air-inlet 21 is provided with a clack-valve 22, opening inward, or other suitable non-return valve, and from the annular chamber 21 the air passes downward through the curved pipes 23, becoming highly heated by the products of combustion from the generator. The heated air issuing from the pipes 23 enters an annular chamber 24 and flows downward through a pipe 25 and enters the generator through a series of radial openings 26, connected by an annular passage 27. There is an outlet 28 for gas which passes a non-return seal (not shown) on its way to the gas-holder, and various lidded orifices, such as 32, Fig. 3, for poking purposes are also provided at the lower extremity of the generator. There is also a supplementary air-supply admitted through a clack-valve 29, opening inward, or other suitable non-return valve to an annular passage 30, whence it passes through radial passages 31 to the interior of the generator.

The operation is as follows: A fire is lighted, and the steam-raising device 5 is heated to the point when it will make steam, and up to this point the water-supply is kept closed and the chimney-valve 16 propped or otherwise abnormally held open until the steam-raiser is sufficiently hot, the gas-holder remaining at or about its lowest limit. The chimney-valve 16 is then placed in its normal position in connection with its mechanism. The water-cock is now opened and water at a pressure due to the head or height of its store-tank passes into the inlet 8 and thence through the pipes 6 of the steam-raising device, in which it is converted into steam and passes to the steam-jet 14 within the chimney 15; but as the latter is now obstructed by the closed valve 16 the steam issuing from the jet 14 returns and passes downward through the heated fuel of the generator and is decomposed by the fuel, with which it chemically interacts, and the resulting gas passes away through the gas-outlet 28, through the non-return seal, through washing or scrubbing devices, and into the gas-holder, which is raised. The gas is unable to escape through the air-inlet 21, as the non-return valve 22 associated with that part becomes closed by the internal pressure, and the gas in the holder is unable to return by reason of its non-return seal. As the gas-holder reaches its maximum height the connections therefrom open the chimney-valve 16, and the steam then flows from the nozzle 14 as a jet up the chimney 15 and induces a current of the gases or products of combustion from the generator, within which a partial vacuum is created, and causes the air-inlet valve 22 to open and admit air, which becomes heated as it passes down through the heating device and before it passes through the fuel in the generator. The current of air passing through the fuel renews its heat previously exhausted by chemical action and passage of the steam, and the products of the resulting combustion pass through the steam-raising and heat-storing device, and so suffice to raise steam for the immediate needs of the steam-jet 14 and also store up heat in the mass of metal 5 for the production of steam during the gas-making period of the cycle of operations. As soon as the gas-holder by its delivery of gas sinks to its predetermined limit the valve 16 in the chimney 15 is once more closed and the previous operations are repeated. As the fuel is consumed further quantities are supplied through the hopper 3 by the attendant or automatically.

It will be observed that the production of gas and operation of the apparatus are controlled automatically by the movement of the chimney-valve 16, which results from the motion of the gas-holder or other reversing device, as before mentioned, the only external attention required being the occasional supply of fuel and removal of ashes by the attendant.

In some cases it may be convenient to take a supply of steam from external sources, in which case the period of air-passage through the fuel may be curtailed.

In the arrangement shown in Fig. 5 the steam from the drum 9 is conducted through a pipe 41 to the cylinder 42 of a motor, the piston-rod 43 of which through a crank 44 drives a train of gears 45, 46, 47, and 48, the last of the train through a crank-arm 49 and link 490 actuating a pawl 50, carried on a radial arm 51, and driving a ratchet-wheel 52, on the axle of which is fixed a crank-arm 53. A chain or cord 54 is connected to the crank-arm 53 and is attached to and passes around the valve-wheel 19 over a guide-pulley 55, and the other end of the chain or cord 54 has a weight 56 suspended from it to keep it taut. In this case the tumbling-gear 160 is dispensed with and the valve 16 is alternately opened and closed by the ratchet-wheel 52, which is driven constantly in one direction by the train of gears from the motor and is prevented from turning back by a retaining-pawl 57, and as the ratchet-wheel 52 turns it carries around with it the crank-arm 53, which by its connected chain or cord 54 turns the valve-wheel 19 first in one direction and then in the other, and so reverses the valve 16. The exhaust-steam from the cylinder 42 of the motor is conducted through a pipe 58 to the jet 14 in the chimney 15.

The water-balance (shown in Fig. 6) consists of an oscillating tipping or tilting vessel 59, divided into two compartments by a diaphragm 60. This vessel is charged with water at any predetermined rate from a pipe and tap 61 or any other convenient source of water-supply. The tilting vessel 59 oscillates on a stationary valve-plug 62, and so alternately puts first one compartment and then the other into communication with a discharge-outlet through the end of the valve-plug. The range of oscillation of the tilting vessel 59 is sufficiently increased by multiplying-wheels 63 and 64, the last of which has a pulley 65 fixed upon its axle and is geared by a chain 66 or equivalent means to the valve-wheel 19. As soon as one compartment is filled the oscillating vessel 59 tilts over on the fixed valve-plug 62, thereby opening the discharge-outlet in the filled compartment and allowing the water to escape therefrom and closing the outlet from the other compartment while it is filling and through the gearing turning the valve-wheel 19 and reversing the valve 16.

What we claim, and desire to secure by Letters Patent of the United States, is—

1. The combination with the chimney of a vertical gas-generator, of a valve, means for automatically reversing said valve, such as connections from the rising and falling gas-holder and a steam-jet to induce air to the generator by causing a draft up the chimney and so carrying away the products of combustion when the gas-holder is full and the valve open, and when the gas-holder sinks and the valve is thereby closed the steam from the jet passes downward through the heated fuel in the generator and, being decomposed, passes away as gas to the holder, all substantially as herein set forth.

2. In a vertical gas-generator, the combination with the chimney, steam-jet and automatic reversing-valve, of the air-supply and air-inlet controlled by a non-return valve or valves, substantially as herein set forth.

In witness whereof we have hereunto set our hands in presence of two witnesses.

CHARLES HENRY SCHILL.
HORACE GASTINEAU HILLS.

Witnesses:
 HENRY BERNOULLI BARLOW,
 HERBERT ROWLAND ABBEY.